US007616148B2

(12) United States Patent
Wu et al.

(10) Patent No.: US 7,616,148 B2
(45) Date of Patent: Nov. 10, 2009

(54) MICROWAVE SMART MOTION SENSOR FOR SECURITY APPLICATIONS

(75) Inventors: Xiaodong Wu, Roseville, CA (US); Harold L. Holvick, El Dorado, CA (US); Leslie K. Green, Applegate, CA (US); James N. Helland, Folsom, CA (US)

(73) Assignee: Honeywell International Inc., Morristown, NJ (US)

( * ) Notice: Subject to any disclaimer, the term of this patent is extended or adjusted under 35 U.S.C. 154(b) by 67 days.

(21) Appl. No.: 11/286,206

(22) Filed: Nov. 23, 2005

(65) Prior Publication Data

US 2007/0115164 A1 May 24, 2007

(51) Int. Cl.
*G01S 13/62* (2006.01)

(52) U.S. Cl. ......................... 342/28; 342/109; 342/112; 342/114; 342/128

(58) Field of Classification Search .................... 342/28
See application file for complete search history.

(56) References Cited

U.S. PATENT DOCUMENTS 2,836,811 A * 5/1958 McArthur ................... 342/114
3,126,539 A * 3/1964 Mulvey ...................... 342/104
3,383,678 A * 5/1968 Palmer ........................ 342/28
3,688,313 A * 8/1972 Kern ........................... 342/97
3,741,655 A * 6/1973 Ling et al. ................. 356/5.03
3,898,655 A * 8/1975 Tresselt ....................... 342/83
3,932,871 A * 1/1976 Foote .......................... 342/28
3,967,283 A * 6/1976 Clark et al. ................... 342/28
4,089,000 A * 5/1978 Bradford ..................... 342/68
4,124,848 A * 11/1978 Clark et al. ................. 340/524
4,197,537 A 4/1980 Follen et al.
4,527,151 A * 7/1985 Byrne ........................ 340/554
4,598,293 A * 7/1986 Wong ......................... 342/201
4,620,192 A * 10/1986 Collins ....................... 342/128
4,633,253 A * 12/1986 Stove et al. ................. 342/162
4,697,184 A * 9/1987 Cheal et al. .................. 342/28
5,136,298 A * 8/1992 Williams .................... 342/112
5,521,600 A * 5/1996 McEwan ..................... 342/27

(Continued)

FOREIGN PATENT DOCUMENTS

EP 1359435 11/2003

(Continued)

OTHER PUBLICATIONS

European Search Report.

*Primary Examiner*—Thomas H Tarcza
*Assistant Examiner*—Matthew M Barker
(74) *Attorney, Agent, or Firm*—Husch Blackwell Sanders Welsh & Katz

(57) ABSTRACT

A dual mode motion sensor for detecting both motion of a moving target and a range of the moving target. The dual mode motion sensor normally operates in a pulse transmission mode. If motion is detected, the sensor automatically switches to a frequency modulated continuous wave transmission mode. This will allow the sensor to determine the range of the moving target. The sensor includes a microcontroller that compares the determined range of the moving target with a predetermined maximum detection range. If the determined range is outside or exceeds the predetermined maximum detection range the sensor will ignore the motion. If the determined range is within the predetermined maximum detection range, an alarm will be generated.

16 Claims, 2 Drawing Sheets

U.S. PATENT DOCUMENTS

| | | | | |
|---|---|---|---|---|
| 5,684,458 | A | 11/1997 | Calvarese | |
| 5,966,090 | A * | 10/1999 | McEwan | 342/27 |
| 6,239,736 | B1 | 5/2001 | McDonald et al. | |
| 6,317,074 | B1 | 11/2001 | Johnson | |
| 6,317,075 | B1 | 11/2001 | Heide et al. | |
| 6,426,716 | B1 | 7/2002 | McEwan | |
| 6,426,717 | B1 * | 7/2002 | Maloratsky | 342/122 |
| 6,756,936 | B1 | 6/2004 | Wu | |
| 6,859,164 | B2 * | 2/2005 | Kurita et al. | 342/28 |
| 7,167,008 | B2 * | 1/2007 | Tsuji | 324/644 |
| 2002/0060639 | A1 | 5/2002 | Harman | |
| 2005/0230604 | A1 | 10/2005 | Rowe | |
| 2006/0055585 | A1 * | 3/2006 | Nagasaku et al. | 342/28 |

FOREIGN PATENT DOCUMENTS

| | | |
|---|---|---|
| GB | 2401500 | 11/2004 |

* cited by examiner

MICROWAVE SMART MOTION SENSOR FOR SECURITY APPLICATIONS

BACKGROUND OF THE INVENTION

The present invention relates to dual technology motion sensors used in the security industry to detect intruders in a protected area. More specifically, the present invention relates to a motion sensor that detects both motion and a range or distance of the motion from the sensor.

BACKGROUND

There are several types of intrusion detection sensors that are commonly used today, such as a Passive InfraRed (PIR) ultrasound or radio detection. Ultrasound motion detectors are inexpensive and operate in narrow bandwidths and are commonly found in automatic door openers.

Passive InfraRed (PIR) sensors are commonly used in home security devices and employ thermal images of objects to detect intrusion. However, PIR sensors have no range adjustment and many false alarms are triggered by motion out of a targeted range.

Radio detection sensors use microwave signals and detect intrusion by comparing a transmitted signal with a received echo signal and detect a Doppler shifted echo. However, the typical radio detection sensor cannot determine the range of a moving target either. Additionally, for the present Doppler based motion detectors, the installer must walk the farthest protected distance from the detector and adjust the sensitivity of the unit and then re-walk that distance and then readjust the sensitivity until the detector alarms at the farthest distance, but no further. This has built-in errors in that a larger target will be detected at a further distance than a smaller target.

Since the above sensors are not capable of measuring ranges, the sensors lack the ability to determine if a detected motion is within the protected area.

In order to determine a range of an object, some motion sensors employ pulse radar or gated technology. Pulse radar uses narrow pulses to get the distance information in the time domain. The distance from the receiver is proportional to the difference in time of the receiver signal and a transmitted signal.

However, the current motion sensors that have ranging capabilities require substantial current consumption, and are expensive. Therefore, there is a need to reduce installation time and to reduce the current consumption that is necessary when determining range.

SUMMARY OF THE INVENTION

The inventive motion detector combines the performance of a motion detector with the performance of an active range determining detector to reduce incidents of false alarms and to reduce installation time. The present invention relates to motion sensors used in the security industry to detect intruders in a protected area.

Specifically, the detector will normally function with the microwave voltage controlled transceiver in the pulse mode. When a motion is detected using Doppler technology, the sensor will switch to FMCW (Frequency Modulated Continuous Wave) transmission.

This will allow the range of the moving object to be determined. This invention uses the microwave Doppler detection to determine when to measure the range. Accordingly, the range determining circuitry is only turned on when needed, and, thus, the current consumption is reduced.

The range determination can use a dedicated DSP (Digital Signal Processing) integrated circuit, or alternatively such DSP feature can be combined into a large microcontroller to perform the necessary Fast Fourier Transform.

If the object exceeds the range set by the installer, it will be ignored. If it is within the range set by the installer, it will be considered an intrusion and an alarm will be initiated. In a FMCW range determining system the frequency received is a direct function of the range not the size of the target.

According to the invention, a dual mode motion sensor is provided. The dual mode sensor comprises a motion detection mode for detecting motion of an object and a distance determination mode for determining a range of the moving object. The distance determination mode uses Frequency Modulated Continuous Wave (FMCW) transmission.

The dual mode motion sensor further includes an alarm algorithm that generates an alarm if the range of detected motion is within a predetermined maximum detection range. The alarm algorithm does not generate an alarm if the range of detected motion exceeds the predetermined maximum motion detection range.

This predetermined maximum detection range (PMDR) is selected by an operator during installation using a selector.

The distance determination mode calculates a frequency of a received signal from an object and the range of the motion is determined by comparing the calculated Frequency value with a previously calculated frequency value from a previous period. The frequency value is calculated using Fast Fourier Transfer.

Also, in accordance with the invention, a dual mode motion detector comprising a microwave Voltage Controlled Oscillate (VCO) having a pulse mode to detect motion of a target and a Frequency Modulated Continuous Wave (FMCW) mode to determine the range of the detected moving target is provided.

When a moving target is detected, the pulse mode switches to the FMCW mode.

The dual mode motion detector further includes a microcontroller, to control the microwave VCO and calculate a frequency of received signal.

The microcontroller determines the range of the moving target by comparing the calculated frequency with a previously calculated frequency value from a previous period.

The microcontroller inhibits an alarm signal from being generated for all moving targets outside a predetermined maximum detection range value where the PMDR is adjustable by an operator.

The range of the detected moving target is determined to be within a cell that has a defined width. The defined width is determined by a frequency bandwidth of operation of the microwave VCO.

Also a corresponding motion detection method is provided.

BRIEF DESCRIPTION OF THE DRAWINGS

These and other features, benefits and advantages of the present invention will become apparent by reference to the following text figures, with like reference numbers referring to like structures across the views, wherein.

DETAILED DESCRIPTION OF THE INVENTION

Figure 1:
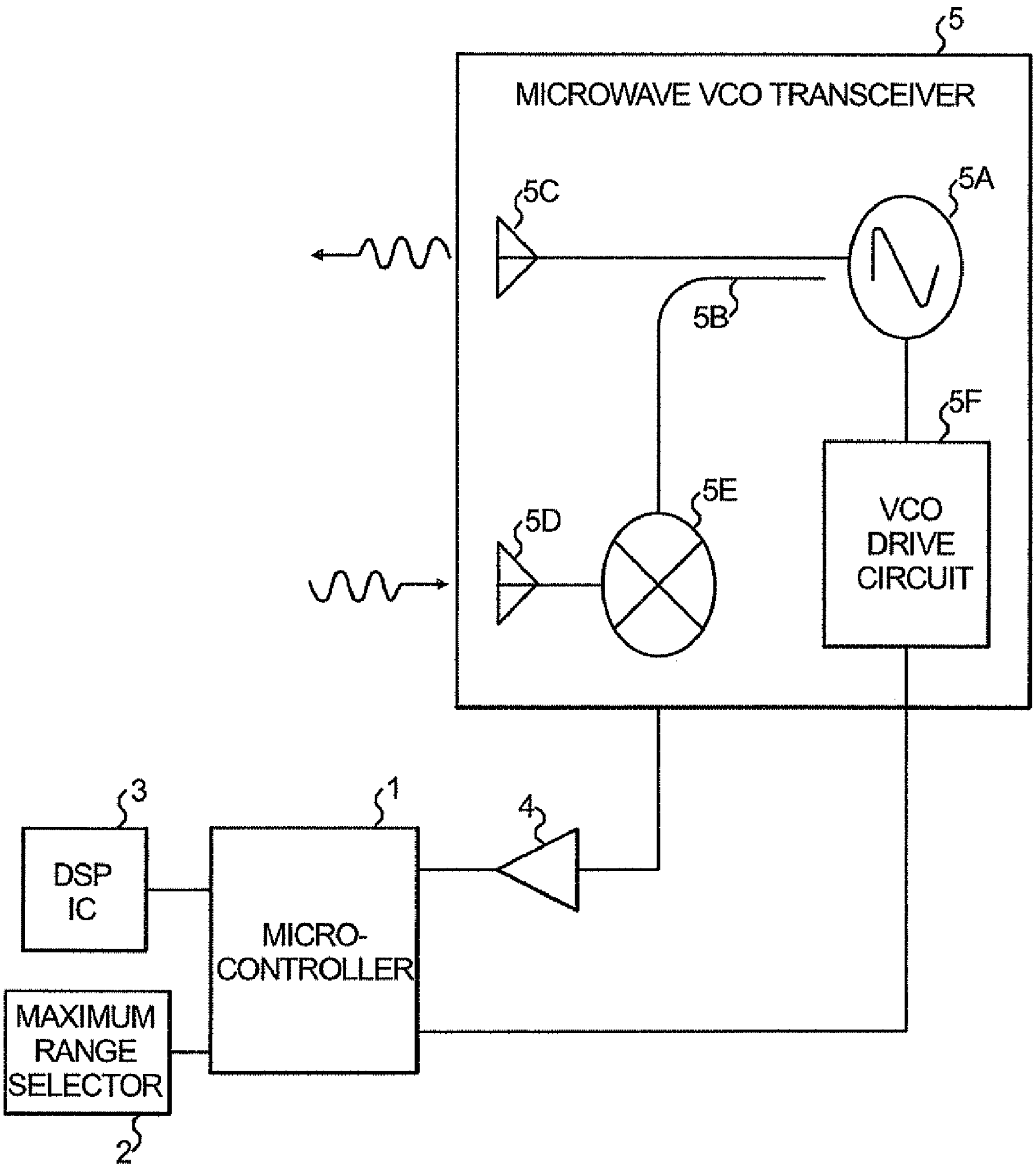
FIG. 1 illustrates a block diagram of the radar motion detector.
Figure 2:
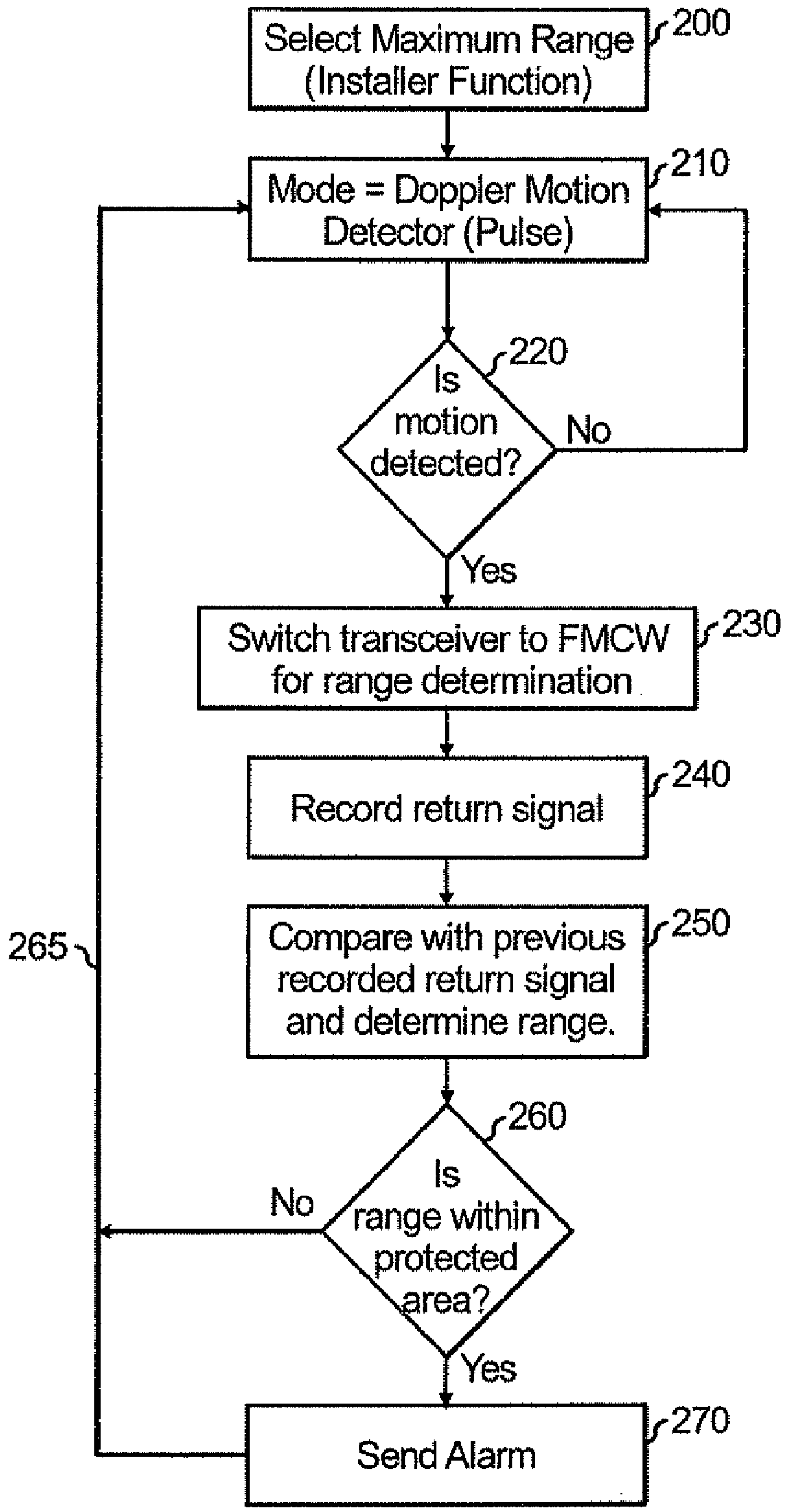
FIG. 2 illustrates a flow of the method of operating the motion detector according to an illustrative embodiment of the invention.

The present invention provides a method and circuitry for use in a microwave motion detector or sensor to determine when to measure the range of a detected motion. FIG. 1 shows the microwave part of the circuitry and its associated block diagrams in accordance with the present invention. However, this circuitry may be combined with other technologies such as Passive InfraRed or acoustic. By using two technologies to determine motion before an alarm is generated, an incorrect alarm is avoided. Operation of the sensor will now be described with reference to the circuitry depicted in FIG. 1 with reference to a method illustrated in FIG. 2.

During installation of the motion sensor, the installer will set the maximum range of protection that is desired using a maximum range selector switch 2 on the printed circuit board (Step 200). By using this switch 2, the installer will not have to "Walk the Room" to set the sensitivity of the detector, as is done with most detectors.

In normal operation, the sensor operates in a pulse mode as a Doppler motion sensor (Step 210). The microcontroller 1 controls the microwave VCO/transceiver 5 and, in particular, the oscillator 5A. The oscillator sends out a microwave signal through the transmit antenna 5C. This signal is reflected back from all the objects and picked up by the receive antenna 5D and then fed to the mixer 5E.

A fraction of the transmitted signal power is coupled to the mixer 5E through the coupler 5B and is mixed with the received echo signal or Doppler signal. This fraction of power is used to drive the mixer. If a Doppler signal is received, the Doppler signal is then amplified in the amplifiers 4 and checked by the microcontroller 1 to determine if it is an intrusion (Step 220). The microcontroller will compare the received Doppler signal with a predefined threshold value to determine if any motion is detected. The predetermined threshold value is based upon a noise floor of the system. This value is set during the design stage for the sensor. If the Doppler signal is greater than this predetermined threshold value, this indicates than an object is moving. A Doppler signal that is below this threshold value would be considered noise. If no motion is detected, the sensor remains in the Pulse mode of transmission (Step 210).

If the microcontroller 1 indicates an intrusion, the microcontroller will trigger the microwave voltage controlled transceiver 5 to switch to Frequency Modulated Continuous Wave (FMCW) transmission (Step 230).

In FMCW transmission, the microwave voltage controlled transceiver 5 will sweep or vary the frequencies of the transmitted signal (Step 230). A new signal will be echoed or received from all objects in front of the microwave voltage controlled transceiver 5, each distance will be indicated by a different received frequency. This frequency will be determined by performing a Fast Fourier Transmission on the recorded signal and the results will be recorded (Step 240). The result will be recorded in a memory section. A signal will be received whether the objects are moving or stationary.

Specifically, the received frequencies will be determined by a DSP (Digital Signal Processor) 3 using a Fast Fourier Transform. Alternatively, in another embodiment of the invention, the Fast Fourier Transform function can be incorporated into a large microcontroller 1.

The sensor will correlate a range to the frequency received; the higher the frequency, the longer the range (Step 250).

The range of the moving target will be determined by comparing the received frequencies from one transmission period with the received frequencies from another transmission period. (Step 250) The received frequencies from another transmission period will be used as a reference. The range of the moving object will be determined based on the change in the received frequencies from one transmission period and the reference frequencies from another transmission period.

The microcontroller 1 will then determine if the range is within a predetermined maximum detection range (Step 260). Specifically, a comparison is made between the determined range of the moving target and the maximum range of interest that was set by the installer using maximum range selector 2. This result is input into the microcontroller as a control signal for its decision of whether to generate an alarm.

If the result of the comparison indicates that the determined range exceeds or is outside the predetermined maximum range of interest, then the microcontroller will instruct or cause the sensor to ignore the detected motion (Step 265). On the other hand, if the result of the comparison indicates that the determined range is within the predetermined maximum value, then the microcontroller 1 will instruct the sensor to generate an alarm to indicate an intrusion within the protected zone or area (Step 270).

In the illustrated embodiment of the invention, the range of a moving target will be determined within a predefined cell range. The resolution of the ranging sensor will be determined by the bandwidth that the regulatory agencies allow.

The above-described sensor prevents detection of motion in more than a desired area and, thus, will prevent the triggering of a false alarm.

The above description and drawing are given to illustrate and provide examples of various aspects of the invention. It is not intended to limit the invention only to the examples and illustrations. Given the benefit of the above disclosure, those skilled in the art may be able to devise various modifications and alternate constructions that although differing from the examples disclosed herein nevertheless enjoy the benefits of the invention and fall within the scope of the invention.

What is claimed is:

1. A dual mode motion sensor comprising:

a motion detection section that detects motion of an object;

a distance determination section adapted for determining a range of said object, said distance determination section includes a transmitter adapted to transmit Frequency Modulated Continuous Wave(FMCW) signal;

a controller for activating said distance determination section only when the motion detection section detects motion; and an alarm generation section adapted for generating an alarm if said distance determination section determines that said range of said detected motion is within a predetermined maximum detection range, and not generating an alarm if said distance determination section determines that said range of said detected motion exceeds said predetermined maximum detection range.

2. The dual mode motion sensor of claim 1, further comprising a selector for adjusting said predetermined maximum detection range.

3. The dual mode motion sensor of claim 1, wherein said range of detected motion is determined within a cell that has a defined width.

4. The dual mode motion sensor of claim 1, wherein said distance determination section calculates frequencies of received signals by performing a fast fourier transfer on said received signals.

5. The dual mode motion sensor of claim 4, wherein said distance determination section determines which of the calculated frequencies corresponds to moving targets by comparing said calculated frequencies with reference frequencies, a change between a calculated frequency and the reference frequencies is indicative of a moving target.

6. The dual mode sensor of claim 1, wherein said controller inhibits the alarm from being generated when said detected motion is outside said predetermined maximum detection range.

7. A dual mode motion detector, comprising:

a microwave Voltage Controlled Oscillator(VCO) adapted to transmit either a pulse signal or a Frequency Modulated Continuous Wave (FMCW) signal, said VCO transmits the pulse signal to detect motion of a target and a FMCW signal to determine a range of a detected moving target; and microcontroller for controlling the VCO to switch from transmitting a pulse signal to transmitting a FMCW signal only when a moving target is detected.

8. The dual mode motion detector of claim 7, wherein said microcontroller calculates frequencies of received signals by performing a fast fourier transformation on the received signal.

9. The dual mode motion detector of claim 8, wherein said microcontroller determines which of the calculated frequencies corresponds to moving targets by comparing said calculated frequencies with reference frequencies, a change between a calculated frequency and a reference frequency is indicative of a moving target.

10. The dual mode motion detector of claim 7, wherein said range of said detected moving target is determined within a cell having a defined width, said defined width is determined by a frequency bandwidth of operation of said microwave voltage controlled oscillator.

11. The dual mode motion detector of claim 7, further comprising a selector for adjusting a predetermined maximum detection range.

12. The dual mode motion detector of claim 7, wherein said microcontroller inhibits an alarm signal from being generated for all moving targets outside a predetermined maximum detection range.

13. The dual mode motion detector of claim 11, wherein said microcontroller transmits an alarm signal when the detected motion is determined to be within said predetermined maximum detection range.

14. A motion detection method using a microwave Voltage Controller Oscillator (VCO) comprising the steps of:

selecting a maximum detection range of interest for an area to be protected by a motion detector, detecting motion of at least one target;

switching a mode of operation from pulse mode transmission for motion detecting to Frequency Modulated Continuous Wave transmission for distance determination when a moving target is detected in the detecting step, determining whether said detected motion is within said maximum detection range using Frequency Modulated Continuous Wave Transmission; and inhibiting the generation of an alarm signal when said detected moving target is determined to be outside said maximum detection range.

15. The motion detection method of claim 14, Wherein when using Frequency Modulated Continuous Wave Transmission, the method further comprising the steps of:

calculating frequencies of received signals;

comparing each calculated frequency with reference frequencies that are stored in memory; and determining which of the calculated frequencies corresponds to moving targets.

16. The motion detection method of claim 15, wherein said step of determining whether said detected motion is within said maximum detection range further includes the steps of:

determining a distance from each moving target to the motion detector using each of the calculated frequencies that correspond to moving targets; and comparing each calculated distance with said selected maximum detection range.

* * * * *

UNITED STATES PATENT AND TRADEMARK OFFICE

CERTIFICATE OF CORRECTION

PATENT NO. : 7,616,148 B2
APPLICATION NO. : 11/286206
DATED : November 10, 2009
INVENTOR(S) : Wu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 180 days.

Signed and Sealed this

Nineteenth Day of October, 2010

David J. Kappos

*Director of the United States Patent and Trademark Office*